(12) United States Patent
Hayden et al.

(10) Patent No.: US 6,903,038 B2
(45) Date of Patent: Jun. 7, 2005

(54) GLASS WITH A MINIMAL STRESS-OPTIC EFFECT

(75) Inventors: Joseph S. Hayden, Clarks Summit, PA (US); Sally Pucilowski, Luzerne, PA (US)

(73) Assignee: Schott Glass Technologies, Inc., Duryea, PA (US)

( * ) Notice: Subject to any disclaimer, the term of this patent is extended or adjusted under 35 U.S.C. 154(b) by 187 days.

(21) Appl. No.: 09/930,478

(22) Filed: Aug. 16, 2001

(65) Prior Publication Data

US 2002/0058577 A1 May 16, 2002

Related U.S. Application Data

(60) Provisional application No. 60/225,643, filed on Aug. 16, 2000.

(51) Int. Cl.[7] .................... C03C 3/072; C03C 3/105; C03C 3/102
(52) U.S. Cl. .................. 501/75; 501/60; 501/62
(58) Field of Search .................. 501/60–62, 74–76

(56) References Cited

U.S. PATENT DOCUMENTS

| | | |
|---|---|---|
| 2,290,947 A | 7/1942 | Dorst |
| 2,736,714 A | 2/1956 | Tiede |
| 3,264,122 A | 8/1966 | Earl |
| 3,405,002 A | 10/1968 | Martin |
| 3,493,405 A | 2/1970 | Thomas |
| 3,663,244 A | 5/1972 | Martin |
| 3,826,660 A | 7/1974 | Wylot et al. |
| 3,846,011 A | 11/1974 | Stein |
| 3,898,093 A * | 8/1975 | Faulstich et al. .............. 501/64 |
| 4,029,897 A | 6/1977 | Mayer et al. |
| 4,109,054 A | 8/1978 | Burgyan |
| 4,123,731 A | 10/1978 | Kanbara et al. |
| 4,395,291 A | 7/1983 | Limare et al. |
| 4,520,115 A | 5/1985 | Speit et al. |
| 4,618,538 A * | 10/1986 | Emonts et al. ............... 428/428 |
| 4,721,690 A | 1/1988 | Ross et al. |
| 4,929,387 A | 5/1990 | Hayden et al. |
| 5,244,484 A | 9/1993 | Chiba et al. |
| 5,273,948 A | 12/1993 | Yamazaki et al. |
| 5,286,269 A | 2/1994 | Paschke et al. |
| 5,808,795 A | 9/1998 | Shimomura et al. |
| 5,969,861 A | 10/1999 | Ueda et al. |
| 6,436,857 B1 * | 8/2002 | Brueck et al. .................. 501/37 |
| 6,468,935 B1 * | 10/2002 | Mori et al. .................... 501/74 |

FOREIGN PATENT DOCUMENTS

| | | | | |
|---|---|---|---|---|
| DE | 3504558 A | * | 8/1986 | ............. C03C/3/06 |
| JP | 04023308 A | * | 1/1992 | ............ H01G/4/12 |

OTHER PUBLICATIONS

Derwent Abstract 1992–077188 of Japanese Patent Publication 04–023308.*

Derwent Abstract 1986–219337 of German Patent Publication DE 3504558 A1.*

Peter D. Lubell, "A Coming Attraction", IEEE Spectrum, Mar. 2000, pp. 72–78.

* cited by examiner

*Primary Examiner*—Karl Group
*Assistant Examiner*—Elizabeth A. Bolden
(74) *Attorney, Agent, or Firm*—Millen White Zelano & Branigan, P.C.

(57) ABSTRACT

A glass comprising in mole percent based on oxide:

| | |
|---|---|
| $SiO_2$ | 55–70 |
| PbO | 30–38 |
| $Na_2O$ | >0–4.5 |
| $K_2O$ | 0–2.5 | and essentially free of $TiO_2$.

26 Claims, 1 Drawing Sheet

GLASS WITH A MINIMAL STRESS-OPTIC EFFECT

This application claims priority of U.S. provisional application No. 60/225,643 filed Aug. 16, 2000.

FIELD OF THE INVENTION

The present invention relates to glasses, and particularly, glasses having a minimal stress-optic effect.

BACKGROUND OF THE INVENTION

Glasses, such as Pockels glasses, having a zero stress-optic coefficient can be used as components in projection televisions or display apparatuses. A Pockels glass is a glass with a certain lead content which should exhibit, under load, no birefringence in monochromatic light. Most glasses, when exposed to external mechanical, or permanent or temporary thermogradiant forces, become depolarized and scatter light. Pockels glasses which have a relatively high lead content do not become birefringent when exposed to these outside forces, and thus are highly desirable for use in certain optical devices.

However, Pockels glasses such as SF 57 suffer several disadvantages. Their high lead content results in the glass having low chemical durability. As a result, these glasses fail to be stain or climate resistant and must be stored or shipped with a desiccator to prevent degradation. This susceptibility to chemical degradation creates hazards when shipping components from overseas locations. Not only must desiccators be used during shipping and storing, but also when being handled and processed by conventional grinding and polishing techniques. Furthermore, exposure to atmospheric conditions may result in the premature deterioration of the glass components. Another disadvantage of SF 57 is that it has a relatively high market price compared to other conventional glasses, e.g., about 4.5 times more expensive than a standard optical glass, BK 7 (Schott Glass Technologies Inc. of Duryea, Pa.).

Attempts to replace the lead in the SF 57 glass with barium to obtain a glass with a minimal stress-optic effect, improved chemical durability, and lower manufacturing costs have been unsuccessful. Furthermore, attempts to simply remove the lead oxide for improving the chemical durability, and lowering the manufacturing costs of low stress-optic coefficient glass have also been unsuccessful because removal of the lead oxide results in a corresponding increase in the stress-optic effect.

Therefore, it would be desirable to produce a glass with a good chemical durability, and a lower manufacturing cost with a minimal stress-optic effect.

SUMMARY OF THE INVENTION

Figure 1:
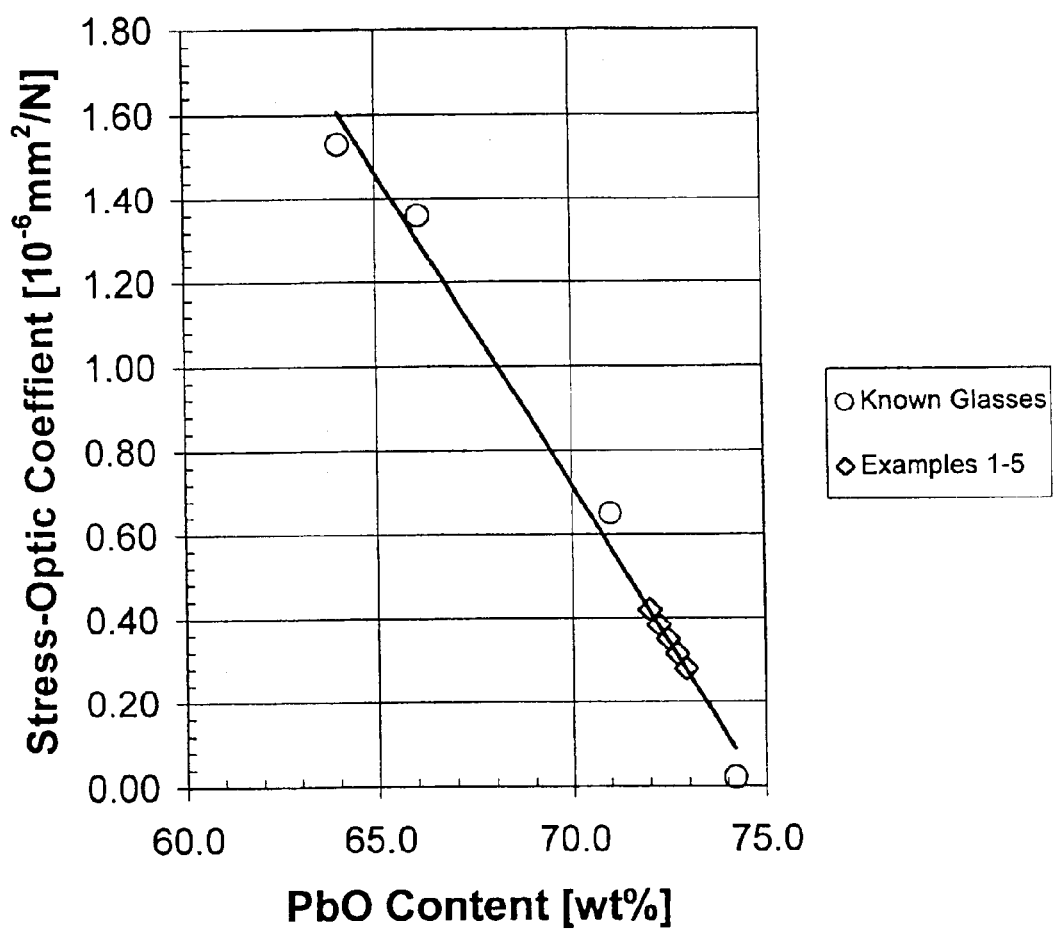
FIG. 1 depicts lead oxide content of several glasses versus stress-optic coefficient.

One exemplary embodiment of the present invention is a glass including in mole percent based on oxide:

| | |
|---|---|
| $SiO_2$ | 55–70 |
| PbO | 30–38 |
| $Na_2O$ | >0–4.5 |
| $K_2O$ | 0–2.5 | with the proviso that the glass is essentially free of $TiO_2$.

Another exemplary embodiment of the invention is a glass made by adding together and melting, in mole percent:

| | |
|---|---|
| $SiO_2$ | 55–70 |
| PbO | 30–38 |
| $Na_2O$ | >0–4.5 |
| $K_2O$ | 0–2.5 | with the proviso that the glass is essentially free of $TiO_2$.

Desirably, the glass can include aluminum oxide ranging from 0.1–5 mole percent, more desirably, from 0.1–2.5 mole percent; and/or zirconium oxide from 0.1–5.5 mole percent, more desirably, from 0.1–5.0 mole percent.

Still another exemplary embodiment of the present invention is a glass including, in mole percent, based on oxide:

| | |
|---|---|
| $SiO_2$ | 49–60 |
| PbO | 33–45 |
| $Na_2O$ | >0–3.5 |
| $K_2O$ | 0–2.5 |
| $ZrO_2$ | >0–5.0 |

An additional embodiment of the present invention can include a glass made by adding together and melting, in mole percent:

| | |
|---|---|
| $SiO_2$ | 49–60 |
| PbO | 33–45 |
| $Na_2O$ | >0–3.5 |
| $K_2O$ | 0–2.5 |
| $ZrO_2$ | >0–5.0 |

Desirably, the glass can include aluminum oxide ranging from 0.1–5 mole percent, more desirably, from 0.1–2.5 mole percent.

Yet another embodiment of the present invention can include a glass including lead and silicon and having a SOC of 1.00 to 2.00 and a CR of 3 or less in combination with a SR of 5 or less, or a SOC of less than 1.00 and a CR of 4 or less in combination with a SR of 51 or less.

One embodiment of glasses of the invention can have the following compositions:

TABLE 1

| Oxide (Mol. %) | General | Preferred | Optimal |
|---|---|---|---|
| $SiO_2$ | 49–70 | 49–68 | 49–65.6 |
| PbO | 30–45 | 30–45 | 31–45 |
| $Li_2O$ | 0–3 | 0–2 | 0–1 |
| $Na_2O$ | 0–5 | 0–4 | 0–3 |
| $K_2O$ | 0–3 | 0–2 | 0–1 |
| Sum $Na_2O$ + $K_2O$ | >0–5 | >0–4 | >0–3 |
| Sum $Li_2O$ + $Na_2O$ + $K_2O$ | 0–5 | 0–4 | 0–3 |
| MgO | 0–5 | 0–3 | 0–1 |
| CaO | 0–5 | 0–3 | 0–1 |
| SrO | 0–5 | 0–3 | 0–1 |
| BaO | 0–5 | 0–3 | 0–1 |
| Sum MgO + CaO + SrO + BaO | 0–5 | 0–3 | 0–1 |

TABLE 1-continued

| Oxide (Mol. %) | General | Preferred | Optimal |
|---|---|---|---|
| $B_2O_3$ | 0–5 | 0–4 | 0–3 |
| $Al_2O_3$ | 0–5 | 0–4 | 0–3 |
| $Y_2O_3$ | 0–5 | 0–4 | 0–3 |
| $La_2O_3$ | 0–5 | 0–4 | 0–3 |
| ZnO | 0–5 | 0–4 | 0–3 |
| $MoO_3$ | 0–5 | 0–4 | 0–3 |
| $Ta_2O_5$ | 0–5 | 0–4 | 0–3 |
| $ZrO_2$ | 0–8 | 0–6 | 0–5 |
| $WO_3$ | 0–5 | 0–4 | 0–3 |
| $In_2O_3$ | 0–5 | 0–4 | 0–3 |
| Sum $B_2O_3$ + $Al_2O_3$ + $Y_2O_3$ + $La_2O_3$ + ZnO + $MoO_3$ + $Ta_2O_5$ + $ZrO_2$ + $WO_3$ + $In_2O_3$ | >0–10 | >0–9 | >0–8 |
| $As_2O_3$ | 0–0.4 | 0–0.4 | 0–0.4 |
| $Sb_2O_3$ | 0–0.4 | 0–0.4 | 0–0.4 |

These glasses desirably have the following properties:

TABLE 2

| Properties | General Range | Preferred Range | Optimal Range |
|---|---|---|---|
| Stress-Optic Coefficient (SOC) | 0.00–0.90 | 0.00–0.50 | 0.00–0.40 |
| Coefficient of Thermal Expansion (CTE) from 20° C.–300° C. | 88.0–90.0 | 88.2–89.0 | 88.3–89.0 |
| Young's Modulus | 50–56 | 50–55 | 50–54 |
| $FOM_{tm}$ | 2.0–12.0 | 4.2–11.5 | 4.3–11.3 |
| $FOM_t$ | 0.26–0.32 | 0.27–0.31 | 0.28–0.30 |
| Acid Resistance | <53 | <5 | <3 |
| Alkali Resistance | <3 | <2 | <2 |
| Stain Resistance | ≦5 | ≦3 | ≦1 |
| Climatic Resistance | ≦4 | ≦2 | ≦1 |

Desirably, glasses of the present invention are essentially free of $TiO_2$. The term "essentially free" means the glass does not have any added amounts of $TiO_2$, although some level of $TiO_2$ may be present as impurities, e.g. of 0.1% or less.

The following abbreviations may be used in the application:

| nd | refractive index (valid for room temperature) |
| Vd | Abbe Number |
| CTE | Coefficient of Thermal Expansion |
| Tg | glass transformation temperature |
| SOC | stress optic coefficient |
| Cp | heat capacity |
| AR | alkali resistance |
| SR | acid resistance |
| FR | stain resistance |
| CR | climatic resistance |

Another embodiment of glasses of the present invention can have the following composition.

TABLE 3

| Oxide | General Mol % | Preferred Mol % | Optimal Mol % |
|---|---|---|---|
| $SiO_2$ | 55–70 | 57–68 | 60.5–65.6 |
| PbO | 30–38 | 30–35 | 31.0–33.5 |
| $Na_2O$ | >0–4.5 | >0–3.5 | 0.9–3.5 |
| $K_2O$ | 0–2.5 | 0–2.5 | 0–2.5 |
| $Al_2O_3$ | 0–5.0 | 0–2.5 | 0–2.5 |
| ZnO | 0–5.0 | 0–5.0 | 0–5.0 |
| $ZrO_2$ | 0–5.5 | 0–5.0 | 0–4 |

TABLE 3-continued

| Oxide | General Mol % | Preferred Mol % | Optimal Mol % |
|---|---|---|---|
| $As_2O_3$ | 0–0.4 | 0–0.4 | 0–0.4 |
| $Al_2O_3$ + $ZrO_2$ | >0–8 | >0–7.5 | >0–6.5 |

These glasses can have the following properties:

TABLE 4

| Property | General | Preferred | Optimal |
|---|---|---|---|
| nd | 1.71019–1.76774 | | |
| Vd | 28.18–30.5 | | |
| Density [gm/cm³] | 4.43–4.80 | | |
| CTE (20–300° C.) [× $10^{-7}$/K] | 59–93 | | |
| CTE (20–50° C.) [× $10^{-7}$/K] | 54–85 | | |
| Tg [° C.] | 418–530 | | |
| Therm. Cond. 25° C. [w/mk] | 0.5902–0.7551 | | |
| Therm. Cond. 90° C. [w/mk] | 0.6513–0.8192 | | |
| Poisson's Ratio | 0.226–0.245 | | |
| Young's Modulus [Gpa] | 54.02–64.07 | | |
| SOC [× $10^{-6}$ mm²/N] | <2 | <1.75 | ≦1.5 |
| Cp (20 C.; 100 C.) [J/gm ° C.] | 0.40–0.44 | | |
| AR | 1–3 | 1–3 | 1–3 |
| SR | 1–4 | 1–3 | 1–2 |
| FR | 0–1 | 0–1 | 0–1 |
| CR | 1–3 | 1–2 | 1 |

Still other glasses of the present invention can have the following composition:

TABLE 5

| Oxide | General Mol % | Preferred Mol % | Optimal Mol % |
|---|---|---|---|
| $SiO_2$ | 49–60 | 49–59 | 49–54 |
| PbO | 33–45 | 35–45 | 39–45 |
| $Na_2O$ | >0–3.5 | >0–2.5 | 0.8–1.0 |
| $K_2O$ | 0–2.5 | >0–2.0 | 0.8–1.1 |
| $Al_2O_3$ | 0–5.0 | 0–2.5 | 0–2.5 |
| $ZrO_2$ | >0–5.0 | >0–5 | >0–4 |
| $As_2O_3$ | 0–0.4 | 0–0.4 | 0–0.4 |
| $Al_2O_3$ + $ZrO_2$ | >0.8 | >0–7.5 | >0–6.5 |

TABLE 6

These glasses can have the following properties:

| Property | General | Preferred | Optimal |
|---|---|---|---|
| nd | 1.78456–1.82182 | | |
| Vd | 26.00–26.22 | | |
| Density [gm/cm³] | 5.00–5.19 | | |
| CTE (20° C.–300° C.) [× $10^{-7}$/K] | 73–84 | | |
| CTE (20° C.–50° C.) [× $10^{-7}$/K] | 66–72 | | |
| Tg [° C.] | 436–487 | | |
| Therm. Cond. 25° C. [W/mK] | 0.6189–0.6495 | | |
| Therm. Cond. 90° C. [W/mK] | 0.6716–0.7058 | | |
| Poisson's Ratio | 0.241–0.245 | | |
| Young's Modulus [GPa] | 53.76–62.20 | | |

TABLE 6-continued

These glasses can have the following properties:

| Property | General | Preferred | Optimal |
|---|---|---|---|
| SOC [× 10$^{-6}$ mm$^2$/N] | <1.0 | ≦0.8 | <0.5 |
| Cp (20° C.; 100° C.) [J/gm ° C.] | 0.38–0.39 | | |
| AR | 1–3 | 1–3 | 1–3 |
| SR | 1–51 | 1–4 | 1–3 |
| FR | 0–2 | 0–2 | 0–2 |
| CR | 1–4 | 1–3 | 1–2 |

Desirably, the acid, alkali, stain, and climatic resistance values are minimized.

A feature of the present invention is a glass with a minimal stress optic effect that provides improved chemical durability and lower manufacturing costs. The glasses of the present invention have a stress-optic coefficient, e.g., about $\frac{1}{10}^{th}$ that of a standard optical glass, such as BK 7. In addition, such a glass also has a thermal response time, e.g., about the same as that of SF 57. Furthermore, the glass of the present invention, desirably, has a stain and acid resistance superior to that of SF 57.

The FOM (Figure of Merit) values in the Tables demonstrate the superiority of the invention in terms of desired thermomechanical properties, in addition to a low stress-optic effect.

$FOM_{tm} = (1-v)/K\alpha E$, where v is the Poisson ratio;

α is the thermal expansion;

K is the stress-optic coefficient; and

E is the Young's modulus of the glass.

The reason for importance of this FOM value is detailed below. To reduce the stress-optic effect, it is desirable to have a small value for K or, alternatively, to have a small value for stress. By minimizing the value of $E\alpha/(1-v)$, the stress of a glass for a given thermogradiant is minimized. Consequently, glass with a maximum value of $(1-v)/K\alpha E$ offers improved performance for this application. In other words, a glass having a $FOM_{tm}$ will have low stress-optic effect and thus minimize the depolarization of an optical glass part experiencing stress.

As an example, the figure of merit $FOM_{tm}$ of SF 57 is about 11.26×10$^6$K. On the other hand, the figure of merit $FOM_{tm}$ of BK 7 is about 0.49×10$^6$K. It is desirable for a glass of the present invention to have a $FOM_{tm}$ about ten times greater than BK 7, that is greater than about 4×10$^6$ K.

Another desirable feature of the glass of the present invention is quick return to thermal equilibrium after exposure to a temporary thermal gradient. A second figure of merit, $FOM_t$, is a measure of the property:

$FOM_t = \lambda \rho Cp$, where

λ is thermal conductivity,

ρ is the glass density, and

Cp is the heat capacity of the glass.

Desirably, this quantity is maximized, which in turn, minimizes the time for an optical component to return to equilibrium after exposure to a transient thermal stress. Consequently, it is highly desirable for a glass of the present invention to have a $FOM_t$ similar to that of SF 57 glass, i.e., about 0.29×10$^{-6}$ m$^2$/sec.

Other glasses of the present invention contain modifier ions that lead to improvement in the chemical durability of the resultant glasses. Possible modifiers include ions of 3+ valence, such as those represented by the formula $R"_2O_3$ where $R"_2O_3$ indicates the sum of $B_2O_3$, $Al_2O_3$, $Y_2O_3$ and/or $La_2O_3$. It is believed that these compounds impart improved durability to the glass. Other additives that may improve chemical durability include ZnO, $TiO_2$, $ZrO_2$, $MoO_3$, $Ta_2O_5$, $WO_3$, and $In_2O_3$. These modifier elements can be employed alone, or as a combination of one or more additives together. Desirably, the total content of all of these ingredients are between about 0 and about 10 wt %. More desirably, the contents of all of these ingredients are between about 0 and about 8 wt %, or even 5 wt %. A desirable additive is $Al_2O_3$ and/or $ZrO_2$.

The glasses of the present invention may contain small levels of alkali metal oxides as shown, particularly $Na_2O$ and $K_2O$, to improve the meltability of the formulations.

What is more, it may also be desirable that the glass of the present invention contain other modifier ions. One such group of ions is the alkaline earth oxides, R' O, where R' O indicates the sum of MgO, CaO, SrO and/or BaO to improve the meltability and to adjust other properties of the resultant glass such as refractive index and dispersion. Moreover, it is also possible to add small levels of refining agents to glasses for the purposes of producing glass free of bubbles. Refining agents may include $As_2O_3$ and $Sb_2O_5$.

However, it is desirable that glasses of the present invention are essentially free of $TiO_2$ so as not to degrade the internal transmission of the glass substrate.

Glasses of the present invention can be produced by tank melting. Such production produces glass less costly than current SF 57. Furthermore, glasses of the present invention will reduce the level of undesired platinum pickup into the melt due to the more favorable melt volume to platinum surface area, and thus lead to improvement in the transmission in the blue portion of the visible spectrum, which is impeded when platinum is absorbed by the glass melt.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by mole, based on oxide.

The entire disclosures of all applications, patents and publications, cited above and below, including U.S. provisional application No. 60/225,643, are hereby incorporated by reference.

EXAMPLES

Sample Production

Each melt is first pre-melted in a two-liter quartz vessel to react all the raw materials and prevent major platinum uptake into the melts. It is common that melts prepared from unreacted batch compounds react with a platinum vessel. Consequently, there is a risk that the platinum vessel will be damaged from this reaction. Accordingly, the quartz pre-melts are subsequently remelted and homogenized in two-liter platinum vessels and cast. In this way, glasses with minimum risk of damage to the platinum vessel are prepared. Each prepared glass is then annealed to produce a casting free of residual stress. The annealing rate for each of the castings is 30° C. per hour. After annealing, appropriate size samples are prepared from each example of glass for completion of various measurements to allow direct evaluation of both figure of merit values.

Testing Procedures

Acid Resistance Test (SR)

The acid resistance test measures the time (T) required for an acid at 25° C. to dissolve a layer with a thickness of 0.1 um. A two or three-digit number is used to indicates the acid resistance. The first or the first two digits indicate the acid resistance class SR. The last digit (separated by a period), where applicable, indicates the change in the surface visible to the unaided eye resulting from the exposure. The acid can be a strong acid, such as nitric acid having a concentration of 0.5 mole/liter at a pH of 0.3, or a weak acidic solution, such as acetate solution with a pH value of 4.6. An overview of the acid resistance classes is provided below in Table 7:

TABLE 7

| Acid Resistance Class SR | 1 | 2 | 3 | 4 | 5 | 51 | 52 | 53 |
|---|---|---|---|---|---|---|---|---|
| pH Value | 0.3 | 0.3 | 0.3 | 0.3 | 0.3 | 4.6 | 4.6 | 4.6 | 4.6 |
| Time (h) | >100 | 10–100 | 1–10 | 0.1–1 | <0.1 | >10 | 1–10 | 0.1–1 | <0.1 |

It should be noted that for SR classes 1–5 a strong acid is used while in SR classes 51–53 a weekly acidic solution is used.

Stain Resistance Test (FR)

The stain resistance test indicates the susceptibility of a glass surface to form a stain when exposed to lightly acidic water, for example, perspiration or acidic condensates, without vaporization. It should be noted that this stain resistance test does not measure the resistance of the glass to climatic change or highly acidic solution. Stain resistance is determined by plain polishing a glass sample and pressing the sample onto a test cuvette having a spherical depression of a maximum of 0.25 mm. The depression contains a few drops of either a test solution I, such as standard acetate solution having a pH of 4.6, or a test solution II, such as sodium acetate buffer solution having a pH of 5.6. Either test solution decomposes the glass surface resulting in interference color stains. Glasses are classified by the elapsed time prior to the first brown-blue stain occurring at a temperature of 25° C. These glass stain resistance classes are depicted below in Table 8:

TABLE 8

| Stain resistance classes FR | 0 | 1 | 2 | 3 | 4 | 5 |
|---|---|---|---|---|---|---|
| Test solution | I | I | I | I | II | II |
| Time (h) | 100 | 100 | 6 | 1 | 1 | 0.2 |
| Color change | no | yes | yes | yes | Yes | yes |

Climatic Resistance Test (CR)

The climatic resistance test measures the influence of water vapor, particularly under high relative humidity and high temperature, in a glass surface. Such influence usually in the form of a cloudy film is generally unremovable by wiping. The procedure includes the steps of exposing a polished, uncoated glass plate to a water vapor at a saturated atmosphere with hourly oscillating temperatures of between 40° C. and 50° C. Water condenses on the glass during the warmer phase, and conversely, dries during the cooling phase which is also augmented by a heating source. The glasses are exposed for 30 hours and are afterwards moved from a climatic chamber for determining the difference $\Delta H$ between the transmission haze before and after testing. The measurements are conducted with a spherical hazemeter. Glasses are classified based on the transmission haze increase $\Delta H$ after a 30-hour test period as depicted below in Table 9:

TABLE 9

| Climatic resistance classes CR | 1 | 2 | 3 | 4 |
|---|---|---|---|---|
| Transmission Haze increase $\Delta H$ | <0.3% | 0.3% <1.0% | 1.0% <2.0% | 2.0% |

Glasses in class CR 1 display no visible attack after being subjected to 30 hours climatic change. Consequently, normal humidity conditions during fabrication and storing of optical glasses in class AR1 should expect no surface attack. Contrarily, the fabrication and storing of glasses in class CR4 having a transmission haze increase of 2% or greater for a 30 hour test should be done in a climate controlled environment because these glasses are very sensitive to such climatic influences.

Alkali Resistance Test (AR)

The alkali resistance test measures the time required at a temperature of 50° C. to remove a glass layer having a thickness of 0.1 $\mu$m in an alkaline solution, such as a sodium hydroxide solution having a concentration of 0.01 mole/liter and a pH equal to 12. The layer thickness is calculated by measuring the weight loss and dividing that weight loss by the product of the glass surface area and density. Glasses are placed into classes based upon time required to remove a 0.1 $\mu$m layer.

The classifications of AR are depicted in Table 10 below.

TABLE 10

| Alkali resistance classes AR | 1 | 2 | 3 | 4 |
|---|---|---|---|---|
| Time (h) | >4 | 1–4 | 0.25–1 | <0.25 |

Stress Optical Coefficient (SOC)

The stress optical coefficient (SOC) is determined at a wavelength of $\lambda=0.5893$ mm and ambient temperature of 21° C. in accordance with the four-edge bending method. The measurement accuracy is $\pm 3\%$, or 0.06 10-6 mm$^2$/N.

Specific Heat Capacity

The mean isobaric specific heat capacity $Cp_{(20° C.-100° C.)}$ is measured from the heat transfer of a hot glass 100° C. in a liquid calorimeter at 20° C.

Other properties hereinafter depicted are determined by methods known by those of ordinary skill in the art.

Five examples (Examples 1–5) of the present invention are made along with a comparative example of SF 57. The lead oxide content of the five examples along with the comparative example of SF 57 is depicted in TABLE 11.

TABLE 11

| Oxide/Glass | Comparative Example | Example 1 | Example 2 | Example 3 | Example 4 | Example 5 |
|---|---|---|---|---|---|---|
| Mol % | | | | | | |
| $SiO_2$ | 54.04 | 54.54 | 55.04 | 55.53 | 56.05 | 56.54 |
| PbO | 44.06 | 43.57 | 43.06 | 42.57 | 42.06 | 41.56 |
| $Na_2O$ | 0.86 | 0.85 | 0.87 | 0.86 | 0.86 | 0.85 |
| $K_2O$ | 0.84 | 0.84 | 0.83 | 0.84 | 0.84 | 0.85 |
| $As_2O_3$ | 0.20 | 0.20 | 0.20 | 0.20 | 0.20 | 0.20 |
| Wt % | | | | | | |
| $SiO_2$ | 24.50 | 24.88 | 25.26 | 25.65 | 26.05 | 26.45 |
| PbO | 74.20 | 73.82 | 73.42 | 73.03 | 72.62 | 72.22 |
| $Na_2O$ | 0.40 | 0.40 | 0.41 | 0.41 | 0.41 | 0.41 |
| $K_2O$ | 0.60 | 0.60 | 0.60 | 0.61 | 0.61 | 0.62 |
| $As_2O_3$ | 0.30 | 0.30 | 0.30 | 0.30 | 0.31 | 0.31 |

The following properties are measured for each glass as depicted in TABLE 12:

TABLE 12

| Glass | Comparative Example 2 | Comparative Example 1 | Example 1 | Example 2 | Example 3 | Example 4 | Example 5 | Symbol/Units |
|---|---|---|---|---|---|---|---|---|
| PbO Content | 0.00 | 74.20 | 73.82 | 73.42 | 73.03 | 72.65 | 72.22 | [wt %] |
| Stress-Optic Coefficient (SOC) | 2.77 | 0.14 | 0.22 | 0.28 | 0.38 | 0.41 | 0.54 | K $[10^{-6}\ mm^2/N]$ |
| Index | 1.51680 | 1.83785 | 1.83244 | 1.82815 | 1.82401 | 1.81941 | 1.81132 | |
| Stress Properties | | | | | | | | |
| Coefficient of Thermal Expansion (CTE) 20° C.–300° C. | 71 | 90.4 | 89.5 | 89.1 | 88.3 | 88.2 | 88.4 | $\alpha\ [10^{-7}/K]$ |
| Poisson's Ratio | 0.206 | 0.258 | 0.250 | 0.249 | 0.248 | 0.240 | 0.247 | v |
| Young's Modulus | 82.0 | 52.1 | 52.4 | 52.8 | 52.5 | 53.0 | 53.4 | E [Gpa] |
| $FOM_{tm} = (1 - v)/(\alpha EK)$ | 0.49 | 11.26 | 7.27 | 5.71 | 4.27 | 3.97 | 2.95 | $[10^{+6}\ °\ C.]$ |
| Thermal Response Time Properties | | | | | | | | |
| Heat Capacity | 0.86 | 0.35 | 0.36 | 0.35 | 0.37 | 0.37 | 0.37 | Cp [J/gmK] |
| Density | 2.51 | 5.45 | 5.41 | 5.38 | 5.34 | 5.31 | 5.24 | $\rho\ [gm/cm^3]$ |
| Thermal Conductivity @ 25° C. | 1.11 | 0.55 | 0.55 | 0.55 | 0.55 | 0.55 | 0.55 | $\lambda$ [W/mK] |
| $FOM_t = \lambda/\rho C$ | 0.517 | 0.290 | 0.280 | 0.293 | 0.280 | 0.289 | 0.286 | $[10^{-5}\ m^2/sec]$ |
| Chemical Properties | | | | | | | | |
| Stain Resistance | 0 | 5 | 5 | 5 | 4 | 3 | 4 | FR |
| Climate Resistance | 2 | 1 | 1 | 1 | 1 | 2 | 1 | CR |
| Acid Resistance | 1 | 52.3 | 52.3 | 52.3 | 51–52.3 | 51–52.3 | 51.3 | SR |

Discussion

As depicted in Table 12, the properties of all five glasses of the present invention along with comparative samples of BK 7 (Comparative Example 2) and SF 57 (Comparative Example 1) are calculated. As shown by the Table, each of the glasses of the present invention having over 72.5 wt % lead oxide exhibits acceptable figure of merit thermomechanical values ranging from about $4 \times 10^{+6}K$ to about $7.3 \times 10^{+6}K$. Furthermore, all the figure of merit thermal equilibrium values are within 5% of Comparative Example 1 of 0.29, and therefore, are acceptable as replacements for this glass. What is more, the chemical properties of glasses of the present invention are improved when the amount of lead in the composition is reduced (See Examples 1–5) as shown by the general improvement in the acid resistance and stain resistance.

For the acid resistance SR values, a digit after the period serves to identify the visible surface changes in addition to the class listing that provides the following information and is not intended as numeric:

0.0 no visible changes 0.1 clear but uneven surface 0.2 interference colors (light selective leaching)

0.3 firmly adhered thin white layer (stronger selective leaching, cloudy surface)

0.4 loosely adhering thicker layers, for example, insoluble reaction products on the surface (this can be a projecting and/or flaking crust or a projecting surfacing; strong attack).

It is important to note that the numbers appearing after the decimal point in a SR chemical durability class value are not to be interpreted literally in a numerical sense since these additional digits are only intended to provide information concerning the appearance of the glass test piece after the test has been completed. Consequently, for purposes of this disclosure, a SR class of 51.0 and a SR class of 51.3 essentially represent an identical SR chemical durability class. See also Tables 14, 17 and 18 in this respect.

FIG. 1 depicts stress-optic coefficients versus lead oxide content of known glasses and the examples of the present invention. As depicted, the examples of the present invention are within targeted ranges of desirable stress-optic coefficient values and consequently would be acceptable as substitutes for SF 57.

Examples 6–8

Examples 6–8 of the present invention have the following compositions:

TABLE 13

| Oxide | Example 6 | Example 7 | Example 8 |
|---|---|---|---|
| Mol % | | | |
| $SiO_2$ | 60.98 | 57.32 | 60.40 |
| $Al_2O_3$ | | 3.09 | 3.26 |
| PbO | 33.01 | 33.24 | 35.03 |
| $Na_2O$ | 2.78 | 0.94 | 1.00 |
| $K_2O$ | 3.05 | | |
| $TiO_2$ | | 5.11 | |
| $As_2O_3$ | 0.17 | 0.29 | 0.31 |
| Wt % | | | |
| $SiO_2$ | 31.85 | 29.43 | 30.49 |
| $Al_2O_3$ | | 2.69 | 2.79 |
| PbO | 64.05 | 63.40 | 65.69 |
| $Na_2O$ | 1.50 | 0.50 | 0.52 |
| $K_2O$ | 2.50 | | |
| $TiO_2$ | | 3.49 | |
| $As_2O_3$ | 0.30 | 0.49 | 0.52 |

These examples were prepared similarly as those described above.

Examples 6–8 are tested for acid resistance (SR), stain resistance (FR), climatic resistance (CR), and alkali resistance (AR). Data from the preceding tests are depicted for Examples 6–8 in Table 14 below:

TABLE 14

| Oxide | Example 6 | Example 7 | Example 8 |
|---|---|---|---|
| SR (acid) | 4.3 | 1 | 1.2 |
| AR (alkali) | 2.3 | 1.3 | 1.3 |
| FR (stain) | 2 | 0 | 1 |
| CR (climatic) | 1 | 1 | 1 |

As depicted, Examples 7 and 8 containing $Al_2O_3$ exhibit better stain resistance and acid resistance than Example 6. Moreover, Example 7 also containing $TiO_2$ exhibits better stain resistance than Example 8, which lacks $TiO_2$. Pertaining to stain resistance, Example 6 exhibits a firmly adhered thin white layer while neither Example 7 or Example 8 exhibits these defects after testing. Moreover, Examples 7 and 8 are classified as 1 for acid resistance while Example 6 is classified as 4. Additionally, Example 7 has no visible changes while Example 6 exhibits a firmly adhered thin white layer, i.e., a cloudy surface. What is more, both Examples 7 and 8 have superior alkali resistance as well. Examples 7 and 8 are classified as 1 for alkali resistance while Example 6 is classified as 2.

It is important to note that the numbers appearing after the decimal point in a AR chemical durability class value are not to be interpreted literally in a numerical sense since these additional digits are only intended to provide information concerning the appearance of the glass test piece after the test has been completed. Consequently, for purposes of this disclosure, a AR class of 1.0 and a AR class of 1.3 essentially represent an identical AR chemical durability class. See also Tables 17 and 18 in this respect.

Other exemplary embodiments of the present invention (Examples 9–25) are made similar to the method discussed above and have the following compositions and properties as depicted in Tables 15–18:

TABLE 15

| Oxide | 9 | 10 | 11 | 12 | 13 | 14 | 15 | 16 | 17 | 18 | 19 | 20 |
|---|---|---|---|---|---|---|---|---|---|---|---|---|
| Mol % | | | | | | | | | | | | |
| $SiO_2$ | 65.52 | 60.52 | 60.52 | 60.52 | 60.52 | 60.52 | 60.52 | 60.52 | 60.52 | 60.52 | 60.52 | 62.53 |
| PbO | 33.24 | 33.24 | 33.24 | 33.24 | 33.24 | 33.24 | 33.24 | 33.24 | 33.24 | 33.24 | 33.24 | 31.24 |
| $Na_2O$ | 0.94 | 0.94 | 0.94 | 0.94 | 3.44 | 0.94 | 0.94 | 2.19 | 0.94 | 2.19 | 2.19 | 0.94 |
| $K_2O$ | | | | | 2.50 | | | 1.25 | | 1.25 | 1.25 | |
| $Al_2O_3$ | | 5.00 | | | | 2.50 | 2.50 | 2.50 | | | | 5.00 |
| ZnO | | | 5.00 | | | 2.50 | | | 2.50 | 2.50 | | |
| $ZrO_2$ | | | | 5.00 | | | 2.50 | | 2.50 | | 2.50 | |
| $As_2O_3$ | 0.29 | 0.29 | 0.29 | 0.29 | 0.29 | 0.29 | 0.29 | 0.29 | 0.29 | 0.29 | 0.29 | 0.29 |
| Wt % | | | | | | | | | | | | |
| $SiO_2$ | 34.32 | 31.13 | 31.41 | 30.85 | 31.45 | 31.27 | 30.99 | 31.29 | 31.12 | 31.43 | 31.15 | 33.08 |
| PbO | 64.68 | 63.52 | 64.08 | 62.94 | 64.17 | 63.8 | 63.23 | 63.84 | 63.51 | 64.13 | 63.55 | 61.41 |
| $Na_2O$ | 0.51 | 0.50 | 0.50 | 0.49 | 1.84 | 0.50 | 0.50 | 1.17 | 0.50 | 1.17 | 1.16 | 0.51 |
| $K_2O$ | | | | | 2.04 | | | 1.01 | | 1.02 | 1.01 | |
| $Al_2O_3$ | | 4.36 | | | | 2.19 | 2.17 | 2.19 | | | | 4.49 |
| ZnO | | | 3.51 | | | 1.75 | | | 1.74 | 1.76 | | |
| $ZrO_2$ | | | | 5.23 | | | 2.63 | | 2.64 | | 2.64 | |
| $As_2O_3$ | 0.50 | 0.49 | 0.50 | 0.49 | 0.50 | 0.49 | 0.49 | 0.49 | 0.49 | 0.50 | 0.49 | 0.51 |

TABLE 16

| Oxide | 21 | 22 | 23 | 24 | 25 |
|---|---|---|---|---|---|
| Mol % | | | | | |
| $SiO_2$ | 58.61 | 53.61 | 53.61 | 53.61 | 50.04 |
| PbO | 39.11 | 39.11 | 39.11 | 39.11 | 44.06 |
| $Na_2O$ | 0.93 | 0.93 | 0.93 | 0.93 | 0.85 |
| $K_2O$ | 1.09 | 1.09 | 1.09 | 1.09 | 0.85 |
| $Al_2O_3$ | | 5.00 | | 2.50 | |
| ZnO | | | | | |
| $ZrO_2$ | | | 5.00 | 2.50 | 4.00 |
| $As_2O_3$ | 0.26 | 0.26 | 0.26 | 0.26 | 0.20 |
| Wt % | | | | | |
| $SiO_2$ | 28.26 | 25.42 | 25.21 | 25.31 | 22.26 |
| PbO | 70.05 | 68.89 | 68.31 | 68.60 | 72.82 |
| $Na_2O$ | 0.46 | 0.45 | 0.45 | 0.45 | 0.39 |
| $K_2O$ | 0.82 | 0.81 | 0.80 | 0.81 | 0.59 |
| $Al_2O_3$ | | 4.02 | | 2.00 | |

TABLE 16-continued

| Oxide | 21 | 22 | 23 | 24 | 25 |
|---|---|---|---|---|---|
| ZnO | | | | | |
| $ZrO_2$ | | | 4.82 | 2.42 | 3.65 |
| $As_2O_3$ | 0.41 | 0.41 | 0.40 | 0.40 | 0.29 |

TABLE 17

| Property | 9 | 10 | 11 | 12 | 13 | 14 | 15 | 16 | 17 | 18 | 19 | 20 |
|---|---|---|---|---|---|---|---|---|---|---|---|---|
| nd | 1.72708 | 1.72782 | 1.75528 | 1.76774 | 1.73674 | 1.73796 | 1.74736 | 1.73333 | 1.76246 | 1.74629 | 1.75629 | 1.71019 |
| Vd | 29.04 | 29.50 | 28.19 | 28.37 | 28.18 | 28.87 | 28.89 | 28.76 | 28.23 | 28.22 | 28.30 | 30.50 |
| Density [gm/cm$^3$] | 4.60 | 4.58 | 4.80 | 4.79 | 4.62 | 4.66 | 4.68 | 4.61 | 4.80 | 4.71 | 4.73 | 4.43 |
| CTE (20° C.–300° C.) [× 10$^{-7}$/K] | 69 | 65 | 69 | 59 | 93 | 67 | 62 | 77 | 65 | 81 | 75 | 62 |
| CTE (20° C.–50° C.) [× 10$^{-7}$/K] | 62 | 58 | 60 | 54 | 85 | 58 | 56 | 69 | 60 | 75 | 69 | 56 |
| Tg [° C.] | 466 | 510 | 466 | 530 | 418 | 483 | 518 | 455 | 490 | 439 | 463 | 521 |
| Therm. Cond. 25° C. [w/mK] | 0.6516 | 0.6745 | 0.6235 | 0.6387 | 0.6059 | 0.6519 | 0.6659 | 0.6495 | 0.5902 | 0.6236 | 0.6243 | 0.7551 |
| Therm. Cond. 90° C. [w/mK] | 0.7097 | 0.7349 | 0.6729 | 0.6955 | 0.6575 | 0.716 | 0.7227 | 0.7022 | 0.6513 | 0.6747 | 0.6799 | 0.8192 |
| Poisson's Ratio | 0.226 | 0.231 | 0.238 | 0.234 | 0.237 | 0.228 | 0.232 | 0.245 | 0.229 | 0.231 | 0.240 | 0.226 |
| Young's Modulus [GPa] | 55.39 | 60.04 | 58.30 | 64.07 | 54.02 | 59.84 | 61.97 | 56.59 | 62.14 | 57.17 | 59.77 | 61.26 |
| SOC [× 10$^{-6}$ mm$^2$/N] | 1.72 | 1.40 | 1.61 | 1.53 | 1.62 | 1.52 | 1.46 | 1.49 | 1.52 | 1.46 | 1.46 | 1.59 |
| Cp (20° C.; 100° C.) [J/gm ° C.] | 0.42 | 0.42 | 0.41 | 0.44 | 0.42 | 0.42 | 0.41 | 0.42 | 0.40 | 0.41 | 0.41 | 0.44 |
| AR | 1.3 | 1.0 | 1.0 | 1.0 | 2.0 | 1.3 | 1.0 | 1.3 | 2.2 | 3.3 | 1.3 | 1 |
| SR | 1.2 | 1.0 | 3.2 | 1.0 | 3–4.3 | 1.0 | 1.0 | 2.2 | 1.3 | 1–2.3 | 2.2 | 1 |
| PR | 0 | 0 | 1 | 0 | 1 | 1 | 0 | 1 | 0 | 1 | 1 | 0 |
| CR | 1 | 1 | 1 | 1 | 1 | 1 | 1 | 1 | 1 | 1 | 1 | 2–3 |

TABLE 18

| Property | 21 | 22 | 23 | 24 | 25 |
|---|---|---|---|---|---|
| nd | *1.78908 | 1.78456 | 1.82182 | 1.80221 | 1.86570 |
| Vd | 26.07 | 26.22 | NA | 26.00 | 23.66 |
| Density [gm/cm$^3$] | 5.07 | 5.00 | 5.19 | 5.09 | 5.56 |
| CTE (20° C.–300° C.) [× 10$^{-7}$/K] | 84 | 79 | 73 | 75 | 80 |
| CTE (20° C.–50° C.) [× 10$^{-7}$/K] | 72 | 72 | 66 | 66 | 70 |
| Tg [° C.] | 436 | 471 | 487 | 482 | 462 |
| Therm. Cond. 25° C. [w/mK] | 0.6222 | 0.6495 | 0.6189 | 0.6411 | 0.5577 |
| Therm. Cond. 90° C. [w/mK] | 0.6750 | 0.7058 | 0.6716 | 0.6940 | 0.5917 |
| Poisson's Ratio | 0.241 | 0.245 | 0.244 | 0.244 | 0.260 |
| Young's Modulus [Gpa] | 53.76 | 58.85 | 62.2 | 60.37 | 58.73 |
| SOC [× 10$^{-6}$ mm$^2$/N] | 0.88 | 0.75 | 0.86 | 0.84 | 0.20 |
| Cp (20° C.; 100° C.) [J/gm ° C.] | 0.38 | 0.39 | 0.38 | 0.39 | 0.37 |
| AR | 2.3 | 2.3 | 2.3 | 1 | 1 |
| SR | 51.3 | 51.3 | 2.3 | 2.3 | 51.3 |
| FR | 2 | 2 | 1 | 1 | 3 |
| CR | 4 | 1 | 1 | 1 | 1 |

Regarding Examples 9–20 as depicted in Table 17, Examples 10, 12, and 15 have particularly desirable SOC values, e.g. Example 10 having SOC of 1.40 and Example 15 having SOC of 1.46, as well as durability. As an example, Examples 10, 12, and 15 have AR, SR, FR and CR, values of 1 or less.

Regarding Examples 21–25 as depicted in Table 18, Example 24 is exemplary of a glass substrate having particularly desirable SOC value (0.84) and durability (AR, FR, and CR values of 1).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A glass having a SOC of about 1–2, a CR of about 3 or less and a SR of about 5 or less, comprising in mole percent based on oxide:

| | |
|---|---|
| $SiO_2$ | 55–<70 |
| PbO | 30–38 |
| $Na_2O$ | >0–4.5 |
| $K_2O$ | 0–2.5 |

>0–5% $Al_2O_3$,
>0–5% $ZrO_2$, and
essentially free of $TiO_2$.

2. A glass according to claim 1, comprising in mole percent based on oxide:

| | |
|---|---|
| $Al_2O_3$ | 0.1–5.0 |
| $ZrO_2$ | 0.1–5.0 |
| Sum $Al_2O_3$ + $ZrO_2$ | >0–8. |

3. A glass according to claim 2 further comprising in mole percent based on oxide:

| | |
|---|---|
| ZnO | 0–5.0 |
| $As_2O_3$ | >0–0.4. |

4. A glass according to claim 1, further comprising in mole percent based on oxide:

| | |
|---|---|
| ZnO | 0–5.0 |
| As$_2$O$_3$ | >0–0.4. |

5. A glass according to claim 1, wherein the glass comprises in mole percent based on oxide 0.1–5% Al$_2$O$_3$ or ZrO$_2$.

6. A glass having a SOC of less than about 1, a CR of about 4 or and a SR of about 5 or less, and comprising in mole percent based on oxide:

| | |
|---|---|
| SiO$_2$ | 49–60 |
| PbO | 33–45 |
| Na$_2$O | >0–3.5 |
| K$_2$O | 0–2.5 |

>0–5% Al$_2$O$_3$,

>0–5% ZrO$_2$, and essentially free of TiO$_2$.

7. A glass according to claim 6, comprising in mole percent based on oxide:

| | |
|---|---|
| Al$_2$O$_3$ | 0.1–5.0 |
| ZrO$_2$ | 0.1–5.0 |
| Sum Al$_2$O$_3$ + ZrO$_2$ | >0–8. |

8. A glass according to claim 6 further comprising in mole percent based on oxide:

| | |
|---|---|
| ZnO | 0–5.0 |
| As$_2$O$_3$ | >0–0.4. |

9. A glass according to claim 6, wherein the glass comprises in mole percent based on oxide 0.1–5% Al$_2$O$_3$ or ZrO$_2$.

10. A glass having a SOC of about 1–2, a CR of about 3 or less, and a SR of about 5 or less, and made by adding together and melting, in mole percent:

| | |
|---|---|
| SiO$_2$ | 55–<70 |
| PbO | 30–38 |
| Na$_2$O | >0–4.5 |
| K$_2$O | 0–2.5 |

>0–5% Al$_2$O$_3$,

>0–5% ZrO$_2$, and essentially free of TiO$_2$.

11. A glass according to claim 10, wherein the glass comprises in mole percent based on oxide 0.1–5% Al$_2$O$_3$ or ZrO$_2$.

12. A glass having a SOC of less than about 1, a CR of about 4 or less, and a SR of about 5 or less, and made by adding together and melting, in mole percent:

| | |
|---|---|
| SiO$_2$ | 49–60 |
| PbO | 33–45 |
| Na$_2$O | >0–3.5 |
| K$_2$O | 0–2.5 |

>0–5% Al$_2$O$_3$,

>0–5% ZrO$_2$, and essentially free of TiO$_2$.

13. A glass according to claim 12, wherein the glass comprises in mole percent based on oxide 0.1–5% Al$_2$O$_3$ or ZrO$_2$.

14. A glass having a SOC of less than 2, a CR of 3 or less, and a SR of 5 or less, and comprising in mole percent based on oxide:

| | |
|---|---|
| SiO$_2$ | 49–<70 |
| PbO | 30–45 |
| Na$_2$O | 0–5 |
| K$_2$O | 0–3 |
| Sum Na$_2$O + K$_2$O | >0–5 |
| Sum B$_2$O$_3$ + Al$_2$O$_3$ + Y$_2$O$_3$ + La$_2$O$_3$ + ZnO + MoO$_3$ + TaO$_5$ + ZrO$_2$ + WO$_3$ + In$_2$O$_3$ | 0–10 |

>0–5% Al$_2$O$_3$,

>0–5% ZiO$_2$, and essentially free of TiO$_2$.

15. A glass according to claim 14, wherein the glass comprises in mole percent based on oxide 0.1–5% Al$_2$O$_3$ or ZrO$_2$.

16. A glass having a SOC of 1–2, a CR of 3 or less, and a SR of 5 or less, and comprising in mole percent based on oxide:

| | |
|---|---|
| SiO$_2$ | 49–<70 |
| PbO | 30–45 |
| Na$_2$O | 0–5 |
| K$_2$O | 0–3 |
| Sum Na$_2$O + K$_2$O | >0–5 |
| Sum ZrO$_2$ + Al$_2$O$_3$ | >0–8 |

>0–5% Al$_2$O$_3$,

>0–5% ZrO$_2$, and essentially free of TiO2.

17. A glass according to claim 16, wherein the glass comprises in mole percent based on oxide 0.1–5% Al$_2$O$_3$ or ZrO$_2$.

18. A glass having a SOC of 1–2, a CR of 3 or less, and a SR of 5 or less, and made by adding together and melting, in mole percent:

| | |
|---|---|
| SiO$_2$ | 49–<70 |
| PbO | 30–45 |
| Na$_2$O | 0–5 |
| K$_2$O | 0–3 |
| Sum Na$_2$O + K$_2$O | >0–5 |
| Sum B$_2$O$_3$ + Al$_2$O$_3$ + Y$_2$O$_3$ + La$_2$O$_3$ + ZnO + MoO$_3$ + TaO$_5$ + ZrO$_2$ + WO$_3$ + In$_2$O$_3$ | 0–5 |

>0–5% Al$_2$O$_3$,

>0–5% ZrO$_2$, and essentially free of TiO$_2$.

19. A glass according to claim 18, wherein the glass comprises in mole percent based on oxide 0.1–5% $Al_2O_3$ or $ZrO_2$.

20. An optical glass, comprising in mole percent based on oxide:

| | |
|---|---|
| $SiO_2$ | 55–<70 |
| PbO | 30–38 |
| $Na_2O$ | >0–4.5 |
| $K_2O$ | 0–2.5 |

>0–5% $Al_2O_3$,
>0–5% $ZrO_2$, and
essentially free of $TiO_2$.

21. An optical glass, comprising in mole percent based on oxide:

| | |
|---|---|
| $SiO_2$ | 49–60 |
| PbO | 33–45 |
| $Na_2O$ | >0–3.5 |
| $K_2O$ | 0–2.5 |

>0–5% $Al_2O_3$,
>0–5% $ZrO_2$, and
essentially free of TiO2.

22. An optical glass made by adding together and melting, in mole percent:

| | |
|---|---|
| $SiO_2$ | 55–<70 |
| PbO | 30–38 |
| $Na_2O$ | >0–4.5 |
| $K_2O$ | 0–2.5 |

>0–5% $Al_2O_3$,
>0–5% $ZrO_2$, and
essentially free of $TiO_2$.

23. An optical glass made by adding together and melting, in mole percent:

| | |
|---|---|
| $SiO_2$ | 49–60 |
| PbO | 33–45 |
| $Na_2O$ | >0–3.5 |
| $K_2O$ | 0–2.5 |

>0–5% $Al_2O_3$,
>0–5% $ZrO_2$, and
essentially free of $TiO_2$.

24. An optical glass, comprising in mole percent based on oxide:

| | |
|---|---|
| $SiO_2$ | 49–<70 |
| PbO | 30–45 |
| $Na_2O$ | 0–5 |
| $K_2O$ | 0–3 |
| Sum $Na_2O + K_2O$ | >0–5 |
| Sum $B_2O_3 + Al_2O_3 + Y_2O_3 + La_2O_3 + ZnO + MoO_3 + TaO_5 + ZrO_2 + WO_3 + In_2O_3$ | 0–10 |

>0–5% $Al_2O_3$,

>0–5% $ZrO_2$, and essentially free of $TiO_2$.

25. An optical glass, comprising in mole percent based on oxide:

| | |
|---|---|
| $SiO_2$ | 49–<70 |
| PbO | 30–45 |
| $Na_2O$ | 0–5 |
| $K_2O$ | 0–3 |
| Sum $Na_2O + K_2O$ | >0–5 |
| Sum $ZrO_2 + Al_2O_3$ | >0–8 |

>0–5% $Al_2O_3$,

>0–5% $ZrO_2$, and essentially free of $TiO_2$.

26. An optical glass made by adding together and melting, in mole percent:

| | |
|---|---|
| $SiO_2$ | 49–<70 |
| PbO | 30–45 |
| $Na_2O$ | 0–5 |
| $K_2O$ | 0–3 |
| Sum $Na_2O + K_2O$ | >0–5 |
| Sum $B_2O_3 + Al_2O_3 + Y_2O_3 + La_2O_3 + ZnO + MoO_3 + TaO_5 + ZrO_2 + WO_3 + In_2O_3$ | 0–5 |

>0–5% $Al_2O_3$,

>0–5% $ZrO_2$, and essentially free of $TiO_2$.

* * * * *